United States Patent [19]

Dickerson

[11] 4,015,073

[45] Mar. 29, 1977

[54] UNIVERSAL LINE TIE AND METHOD OF MAKING SAME

[75] Inventor: Gary R. Dickerson, Centralia, Mo.

[73] Assignee: A. B. Chance Company, Centralia, Mo.

[22] Filed: Jan. 2, 1976

[21] Appl. No.: 646,042

[52] U.S. Cl. .............................. 174/148; 24/131 C; 24/261 LT; 72/66; 72/371; 72/384; 140/90; 140/106; 140/124; 174/173; 174/DIG. 12;

[51] Int. Cl.² .................. H01B 17/22; B21F 3/027; B21F/45/16 F16G 11/00

[58] Field of Search ..... 174/42, 148, 173, DIG. 12; 24/81 KK, 115 N, 129 C, 131 C, 243 C, 261 R, 261 WC, 261 LT, 261 F, 261 G; 57/144, 145, 149; 72/371, 66, 137, 145, 384, 146, 148, 152; 140/90, 106, 124; 248/63; 256/57

[56] References Cited

UNITED STATES PATENTS

| | | | |
|---|---|---|---|
| 393,920 | 12/1888 | Owen | 72/66 |
| 1,246,345 | 11/1917 | Steen | 140/90 |
| 1,275,517 | 8/1918 | Ames et al. | 140/90 |
| 3,042,745 | 7/1962 | Williams | 174/173 |
| 3,177,905 | 4/1965 | Kitselman | 72/66 X |
| 3,555,625 | 1/1971 | Hoban | 174/173 X |
| 3,664,010 | 5/1972 | D'Agati | 174/173 X |

FOREIGN PATENTS OR APPLICATIONS

| | | | |
|---|---|---|---|
| 1,077,740 | 3/1960 | Germany | 174/173 |
| 12,347 | 4/1969 | Japan | 174/173 |

*Primary Examiner*—Laramie E. Askin

*Attorney, Agent, or Firm*—Schmidt, Johnson, Hovey & Williams

[57] ABSTRACT

A low cost, lightweight, helically preformed line tie is disclosed which is configured for yieldably securing an elongated conductor or the like to various standard sizes of conventional, grooved insulative supports without the need for specialized ties by provision of a unitary, substantially shape-retaining resilient metallic wire tie which includes a central, generally U-shaped, line-receiving bight and a pair of legs extending therefrom which have intermediate sections adjacent the bight and helically formed line-gripping terminal sections; in preferred forms, the intermediate sections include a pair of interconnected, generally straight segments disposed at an angle relative to each other, and the intermediate sections are wrapped under tension about the support body with the helical leg sections secured about the line for yieldably securing the latter to the support without creation of localized, rigidly held stress areas at the line support points which can lead to premature line failure by virtue of bending movements of the line at the support points. In this manner characteristic wind-induced line vibrations can be safely and effectively dampened along a relatively long length of the line adjacent the insulator which reduces wear and tear of the line. A simplified tie forming method is also provided which permits essentially automatic, assembly line production of the ties through the use of sequential bend-forming stations and a unique mandrel-type helical forming station which completely eliminates complicated forming implements and methods heretofore employed.

23 Claims, 22 Drawing Figures

50
30a
30b
30c
30d
32a
32b
32c
32d
39
39a
39b
40a
40b
42a
42b
44a
44b
46a
48a
52
53
53'
54
56
58
60
62
64
66
68
70
72
160
162
164
166

UNIVERSAL LINE TIE AND METHOD OF MAKING SAME

This invention relates to helically preformed line ties of the type used by electrical utilities for securing elongated transmission and distribution lines to insulative supports mounted on poles or crossarms. More particularly, it is concerned with lightweight, metallic ties and a method of forming the same wherein the ties are configured to allow use thereof with a variety of standard insulative supports of varying dimensions so that the need for specialized ties for each type of insulator is eliminated. In addition, the ties hereof are designed for tensioned application to a line and support such that the line is yieldably secured to the support without creation of rigidly held, localized stress areas at line support points which can cause premature, vibration-induced line failure.

It is common practice for electrical utilities and others to secure elongated lines such as distribution conductors to supports along the length thereof by means of helically formed metallic ties. For example, many utilities employ porcelain insulative supports which include a transversely extending groove in the top thereof along with a circumferentially extending annular groove beneath the upper lip of the insulator. In certain instances the conductor is "top tied" to the insulator by placing the line within the tansversely extending top groove and applying one or more helically preformed line ties to the line and insulator for securing the same together. In other cases a conductor may be "side tied" by placement of the line within one section of the annular groove, followed by application of line ties around the conductor and support. In either case, the line tie generally serves to rigidly secure the conductor to the insulator in order to provide adequate support for the line.

A number of different types of preformed line ties have been proposed in the past. See, for example, U.S. Pat. Nos. 3,127,140, 3,154,633 and 3,501,116. Although line ties of various configurations and types have achieved wide acceptance in the art, a number of problems have remained in connection with some of these devices. For example, conventional ties have heretofore been carefully configured for use with only a single size of insulator and were not effectively usable with other insulator sizes. Thus, utilities have been forced to stock a wide variety of specialized ties as opposed to the more preferable practice of having a stock of ties which could be applied to a number of insulators.

Furthermore, many such prior line ties are fabricated from relatively heavy gauge metallic wire which is formed to present a series of helical, substantially rigid line gripping convolutions. Such units also normally include a central, loop bight portion which extends in crossing relationship over the conductor seated within the insulator groove in order to rigidly hold the line in place. In such installations, the characteristic high frequency, low amplitude vibration patterns induced in the line by wind load conditions can create localized, fulcrum-like stress areas at the point of the essentially rigid connection between the line tie bight and conductor. That is, a large portion of the vibratory forces experienced at the line are abruptly damped at the localized stress area, as opposed to being spread out over a length of the conductor. In certain instances it has been observed that conductors tend to crack or otherwise fail at such stress points by virtue of such wind induced vibrational forces.

Another troublesome problem encountered in connection with conventional line ties stems from the complicated and costly procedures required for fabrication thereof. For example, certain known processes employ complex machinery for straightening the heavy gauge wire used, followed by helically forming the entire length of a set of wires, whereupon the central bight portion thereof must be straightened and formed to the specific configuration necessary for a particular insulator and line application. As can be appreciated, this procedure is a costly proposition and moreover requires constant operator control in order to produce finished products of acceptable quality. Finally, the machinery necessary for performing these multiple steps is extremely complex and costly which of course represents a significant drawback. Exemplary forming machines heretofore employed are disclosed in U.S. Pat. Nos. 2,588,663 and 2,769,478.

It is therefore the most important object of the present invention to provide a low cost, lightweight preformed line tie which can be effectively used with a variety of dimensionally different supports for tying a line thereto, and which is easily produceable using substantially automated, assembly line techniques and without the necessity of complex forming apparatus or constant operator control.

Another object of the invention is to provide a universal line tie which is operable to yieldably secure an elongated line to a support therefor (such as a conventional, grooved insulator) without creation of localized, fulcrum-like stress areas at the support points for the line which have been known to cause premature failure of the line by virtue of line vibrations and bending caused by wind load or other untoward ambient conditions.

As a corollary to the foregoing, another object of the invention is to provide a preferred line tie of the type described which is formed from relatively lightweight metallic wire material as a unitary member including a central, generally U-shaped, line-receiving bight with a pair of parallel legs extending therefrom which each include an intermediate support-engaging section formed of a pair of interconnected, generally straight, angularly disposed segments and a helical line gripping terminal section; in use, the bight portion is positioned over the line adjacent one side of a support therefor, with the intermediate sections being placed under tension and wrapped around the support for yieldably engaging the latter, with the helical leg sections extending from the support along the length of the line and in gripping engagement with the latter for completing the tie assembly.

A further object of the invention is to provide a simplified forming method for producing helically preformed line ties in accordance with the invention which includes a series of simple, sequential bending steps followed by a mandrel-winding procedure which serves to quickly and efficiently helically form the tie legs and also to unwind the same from the mandrel to produce a finished line tie.

Finally, a still further object is to provide a forming method wherein a shiftable carriage is mounted on an elongated, stationary forming rod and is movable along a helical path of travel for successively forming helical convolutions in a line tie and thence removing the tie from the forming rod while simultaneously separating the tie legs to produce a finished product.

In the drawings:

FIG. 1 is a perspective view of a lightweight, preformed universal line tie in accordance with the invention;

FIGS. 2–6 sequentially illustrate the steps followed in installing a pair of universal line ties as shown in FIG. 1 in a "top-tie" assembly for securing an elongated line to a conventional, grooved insulator support, with FIG. 6 depicting the completed assembly in elevation;

Figures 1, 17, 18, 19, 20, 21:
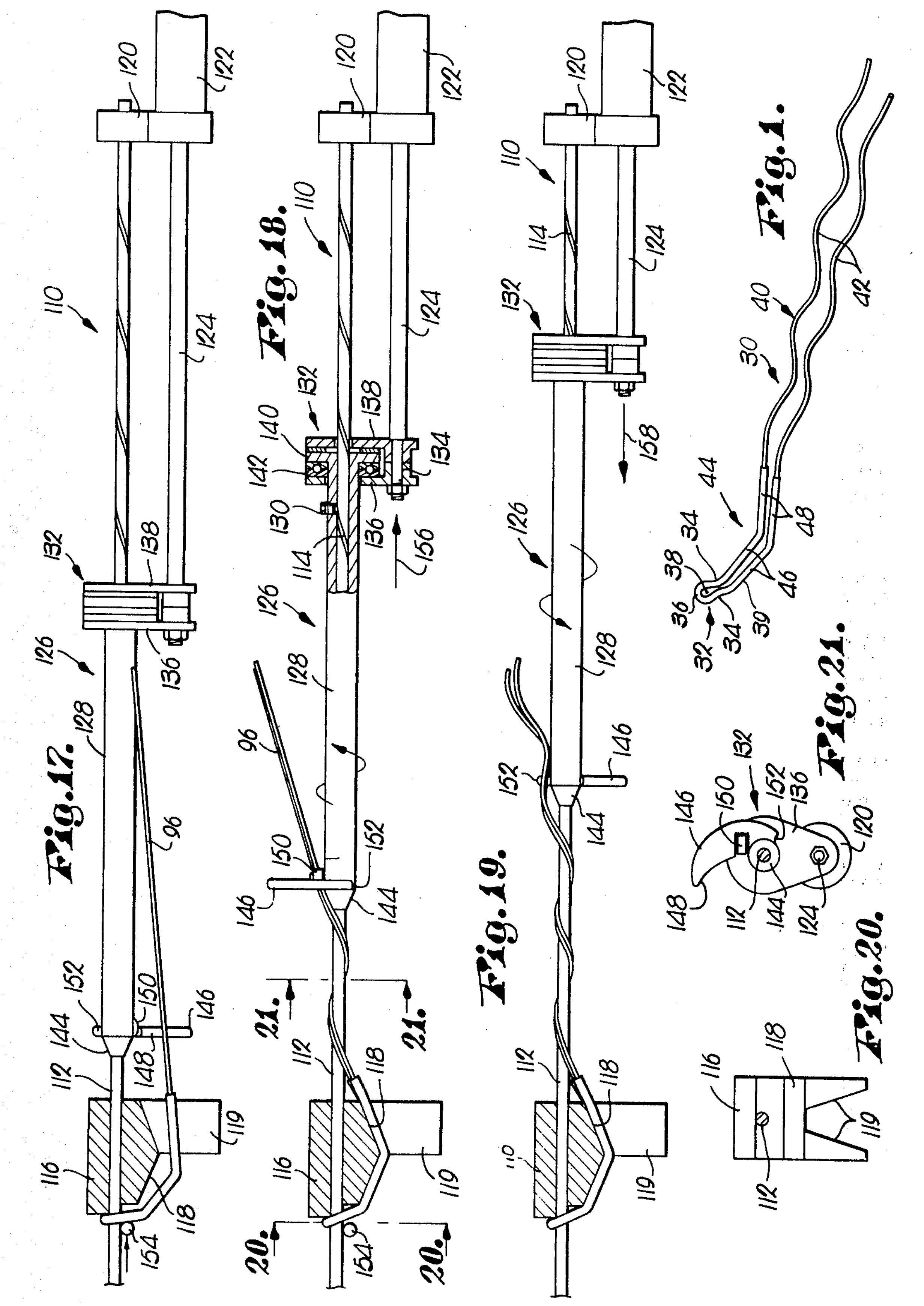
FIG. 17 is an elevational view of the apparatus and method used in the first step in helically forming the legs of the line ties hereof.
FIG. 18 is an elevational view of the helical forming operation followed in the production of the ties hereof, with the forming apparatus employed being shown partially in section to illustrate the details thereof.
FIG. 19 is an elevational view depicting the unwinding step for removing the helically formed tie legs from the forming apparatus.
FIG. 20 is a vertical sectional view taken along line 20—20 of FIG. 18 and further illustrating the apparatus for helically forming the tie legs.
FIG. 21 is a vertical sectional view taken along the line 21—21 of FIG. 18 and further depicting the shiftable member used in helically forming the tie legs.

Turning now to the drawings, a preferred line tie 30 in accordance with the invention is depicted in FIG. 1. Tie 30 includes a central, generally U-shaped bight portion 32 having a pair of spaced, adjacent arms 34 and an arcuate connective portion 36 which cooperatively define a line-receiving opening 38. As illustrated in the drawing, bight portion 32 can be "necked down" at the area of arms 34 so that opening 38 is substantially circular. In addition, an abrasion resistant, synthetic resin protective sleeve 39 is positioned about the central portion of tie 30 for purposes which will be explained.

Tie 30 also includes a pair of adjacent, generally parallel legs 40 which are of substantially equal length and extend in the same general direction. Each leg 40 includes a helically formed line-gripping section 42 defined by a number of helical convolutions of constant diameter, along with an intermediate, somewhat V-shaped section 44 (substantially covered by sleeve 39 in FIG. 1) extending between an arm 34 and the corresponding line-gripping section 42. Each intermediate section 44 is defined by interconnected, substantially rectilinear stretches 46 and 48 which are disposed at an angle relative to each other, as will be seen from a study of FIG. 1.

In preferred forms, tie 30 is fabricated from a unitary strand of substantially shape retaining, yieldable wire material such as 0.102 inch diameter aluminum clad steel wire sold under the trade designation "Alumoweld" by the Copperweld Steel Company of Glassport, Pa. In addition, in the embodiment shown, tie 30 is configured so that the included angle between stretches 46 and 48 of each intermediate section 44 is approximately 153°, while the included angle between each arm 34 and the adjacent stretch 46 is about 116°. Of course, other materials and specific configurations can be used in producing line ties in accordance with the present invention. Finally, the helical portions of the tie legs are preferably coated with an adhesively applied aluminum oxide grit in order to enhance the line-gripping properties thereof.

Sleeve 39 is preferably formed of high density polyethylene material having a tensile strength of 3100–5500 psi, a Shore D hardness of 60–70, excellent UV stability and a flexural modulus of $1.0–3.0 \times 10^5$ psi. This material is highly resistant to abrasion, can be easily formed, and has excellent weatherability. In use, sleeve 39 contacts the insulator supporting the tied line and also the line itself in order to minimize the possibility of line damage which can occur if a metallic tie is in direct contact with the tied line.

The installation of a pair of ties 30 in a so-called "top tied" arrangement is illustrated in FIGS. 2–6. Although the line ties depicted in these and certain other Figures do not include central synthetic resin sleeves 39, it is to be understood that this feature may optionally be included on the ties (see, e.g., FIG.9). In this case an elongated line 50 which may be in the form of an electrical distribution line or the like is supported by a porcelain insulator 52 which is conventionally mounted on the crossarm of a utility pole by means of a supporting pin 54. Insulator 52 is of conventional construction and includes an uppermost, transversely extending, line-receiving groove 56 (see FIG. 7), a necked-down portion 58 and a radially enlarged body portion 60. Transverse groove 56 is in the form of a concavity extending across the upper, lip-defining section 62 of insulator 52. As will be seen from a study of FIGS. 2–6, a circumferentially extending, peripheral groove 64 is defined by the underside of lip-defining section 62, necked-down portion 58 and the upper surface of body portion 60.

Figure 2:
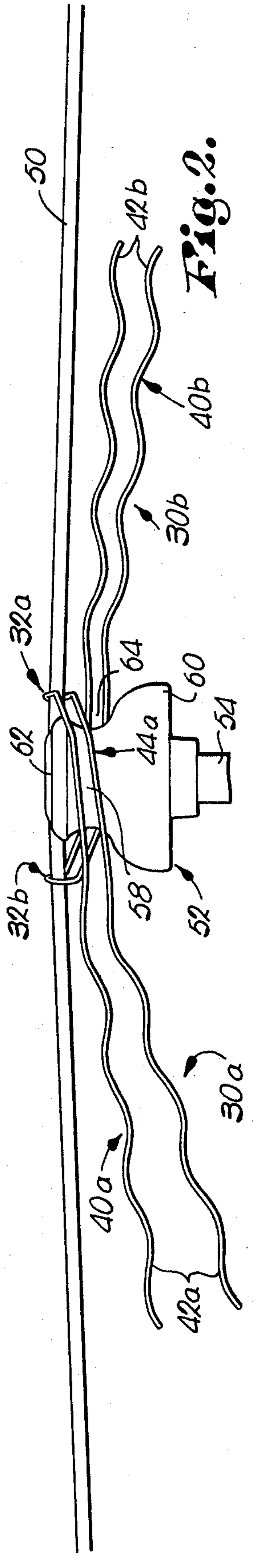

The application of a pair of line ties 30 in the top tied arrangement of FIG. 6 preferably proceeds as follows. First, line 50 is placed within groove 56 with a flexible neoprene sleeve element 53 preferably being positioned over the line at the area of engagement with insulator 52, although sleeve 53 is not absolutely necessary. A pair of identical line ties 30*a* and 30*b* are then positioned over line 50 as illustrated in FIG. 2 with the respective bight portions 32*a* and 32*b* thereof receiving line 50 on opposite sides of insulator 52. In this initial step the respective pairs of legs 40*a* and 40*b* extend in generally opposite directions and in crossing relationship to insulator 52, and are seated within opposed portions of peripheral groove 64.

Figure 3:
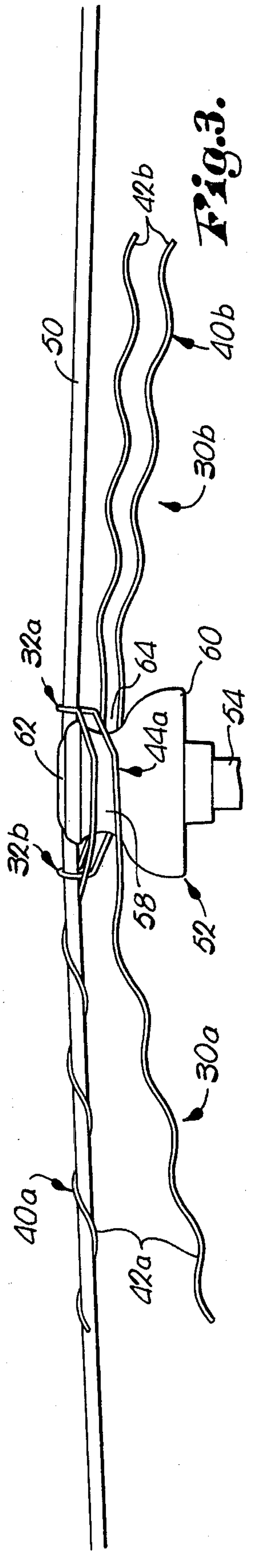
Figure 4:
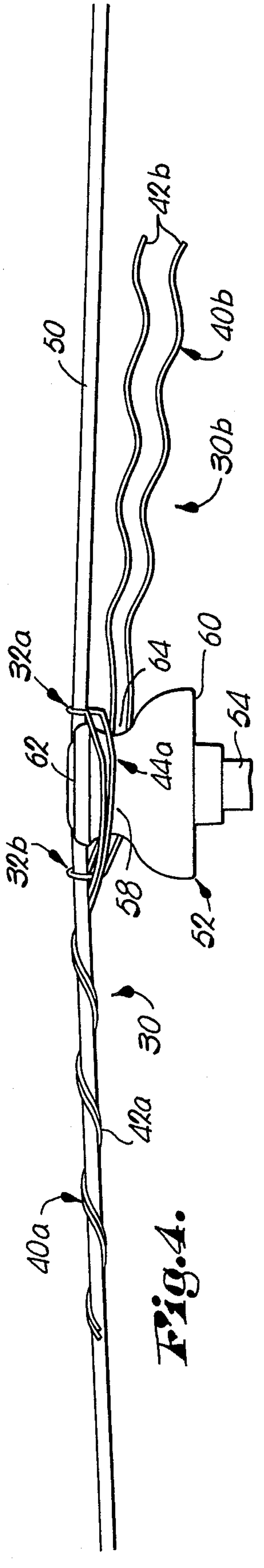
Figure 5:
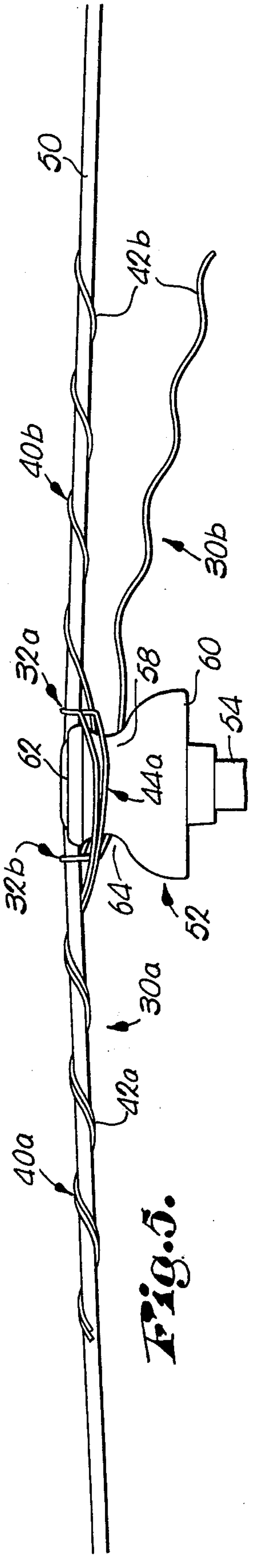

The second step involves pulling one leg 40*a* under tension for ensuring that at least a part of intermediate section 44*a* thereof yieldably engages necked-down portion 58 of insulator 52. At this point the helically formed line-gripping section 42*a* of this leg is wrapped around the adjacent stretch of line 50 as depicted in FIG. 3. The second leg 40*a* is then similarly pulled so that the intermediate section thereof yieldably engages necked-down portion 58 and the corresponding helical portion 42*a* thereof is wrapped around line 50 so that the two legs are positioned along the length of line 50 in adjacent relationship.

The installation of tie 30*b* proceeds exactly as described in connection with tie 30*a* in that the respective legs 40*b* thereof are individually pulled so that the intermediate sections 44*b* thereof yieldably engage the insulator and are then wrapped around the adjacent section of line 50. In this manner the respective line ties 30*a* and 30*b* are applied so that they extend in opposite directions along the length of line 50 and engage supporting insulator 52 at opposite points in juxtaposition to line 50. This completed assembly is illustrated in FIGS. 6 and 7.

Figures 6, 7, 8, 9, 22:
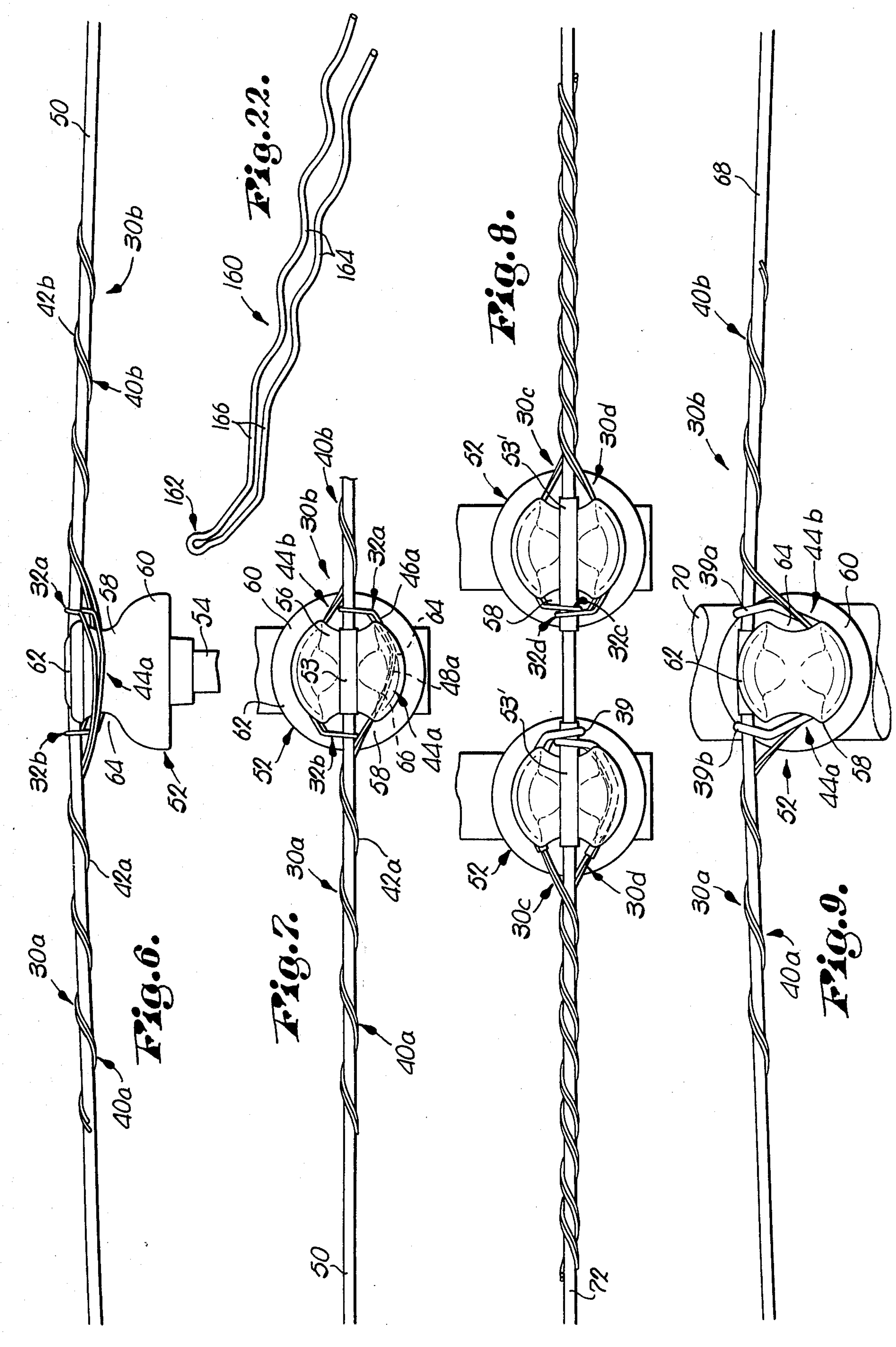
FIG. 7 is a plan view of the assembly shown in FIG. 6., with a portion of one of the line ties illustrated in phantom to show the yieldable gripping engagement thereof with the insulator support.
FIG. 8 is a plan view of an elongated conductor supported by a pair of adjacent, grooved insulator supports, with a pair of line ties in accordance with the invention applied about each support for yieldably securing the line thereto.
FIG. 9 is an elevational view of a conductor seated within the peripheral groove of an insulator support and being yieldably secured therein by means of a pair of oppositely extending line ties in accordance with the invention.
FIG. 22 is a perspective view of a line tie formed of synthetic resin material which is similar in configuration to the tie depicted in FIG. 1.
Figure 11:
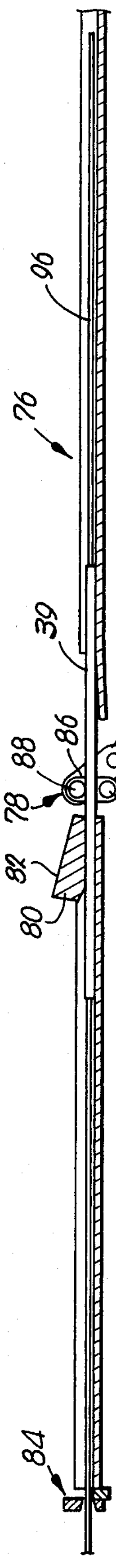
FIG. 11 is an elevational view of a metallic wire blank seated within the first bend-forming station prior to the first forming step followed in the production of the line ties hereof.

The operation of the line ties of the invention when installed as illustraed in FIGS. 6 and 7 is significantly different than ties heretofore available. The prime operational difference resides in the fact that the ties hereof provide a yieldable, flexible connection between line 50 and insulator 52, while at the same time biasing the line into seating engagement with the insulator. This yieldable connection is obtained by virtue of the fact that the intermediate portions 44*a* and 44*b* of the respective ties are under tension and in engagement with opposite sides of the necked-down portion 58 of the insulative support. For example, during characteristic high frequency, low amplitude vibrations of line 50 (which may be caused by ambient wind load conditions), line 50 is not rigidly held in place within groove 56 of insulator 52 but rather is permitted to move to a limited extent. This has the effect of permitting dampening of line vibrations along a significant length of the line of each side of the line support point. This operation is to be contrasted with conventional top-tied arrangements wherein a tie of relatively heavy guage metal extends in crossing relationship over the conductor and insulator top and creates a point of rigid connection between the line and insulator along the length of the transverse top groove. This rigid connection serves to abruptly damp line vibrations at the localized stress area created by the tie crossover, as opposed to the progressive dampening provided with the ties of the present invention. Such abrupt damping has been known to lead to line bending and ultimate failure by virtue of cracking or breaking thereof.

The substantially shape-retaining yet yieldable nature of the lightweight ties of this invention also permits use thereof in a variety of tying configurations and on insulators of varying sizes and diameters. This latter fact is of course important in that it permits utilities to stock only a single type of universal line tie which can be used on a wide variety of the insulators in service, as opposed to keeping specialized line ties for each size of insulator.

The operation of the ties of the present invention in accommodating insulators of various diameters can be seen from a comparative study of FIGS. 7 and 9. For example, in the completed top-tied assembly illustrated in FIG. 7, the depicted intermediate portions 44*a* engage necked-down area 58 on insulator 52 at a point referred to by the numeral 66 so that tie 40*a* serves to bias line 50 into seating engagement with groove 56. It is to be noted however, that the apexes of the respective intermediate sections 44*a* (defined by stretches 46*a* and 48*a*) are in slightly spaced relationship from the adjacent portion of the insulator wall. Of course intermediate portions 44*b* are similarly seated with and engage the opposite side of portion 58 so that ties 30*a* and 30*b* serve to cooperatively and yieldably bias line 50 into seating engagement with groove 56.

Referring now to FIG. 9, a "side-tied" assembly is shown wherein conductor 68 is seated within the upper portion of peripheral groove 64 of an insulator 52. The depicted insulator 52 is identical with that shown in FIGS. 3–7, but in this case is mounted on a utility pole 70 in laterally extending relationship therefrom. As illustrated, a pair of line ties 30*a* and 30*b* having central synthetic resin elements 39*a* and 39*b* thereon are employed for yieldably securing conductor 68 within groove 64, and each has the bight portion thereof positioned over line 68 adjacent opposite sides of insulator 52 with the legs 40*a* and 40*b* grippingly engaging sections of line 68 on each side of the insulator. In this case however, the respective intermediate sections 44*a* and 44*b* extend over halfway around the necked-down portion 58 of insulator 52, as opposed to the FIG. 7 configuration wherein the intermediate sections extend only under lip-defining structure 62 and approximately halfway around necked-down portion 58. However, by virtue of the resilient nature of the ties hereof the V-shaped intermediate portions 44*a* and 44*b* in FIG. 9 can deform as necessary to accommodate the larger effective diameter of the side tie support. This deformation causes the respective intermediate sections of the ties to engage necked-down portion 58 at different positions along the length of the sections than those illustrated in FIG. 7, which as a consequence will cause the distance between the adjacent insulator wall and the apices of the intermediate sections to be different than in FIG. 7. However, it will be readily appreciated that the necessary yieldable biasing function of the ties is maintained in either configuration.

Another top-tied assembly is illustrated in FIG. 8 wherein a pair of adjacent insulators 52 support a conductor 72. As shown, conductor 72 is secured to the respective insulators 52 by provision of a pair of line ties 30*c* and 30*d*. In this case however, the leg portions of the respective line ties 30*c* and 30*d* extend in the same general direction and engage conductor 72 along the same length thereof. This is accomplished by positioning the respective bight portions 32*c* and 32*d* over line 72 adjacent one side of each insulator 52, and passing the ties around the necked-down portions 58 of the insulators 52 in the manner depicted. The helical leg sections are then individually applied to line 72 in the manner described above. Note that with each pair of ties a tubular sleeve 53' is provided on line 72 which is of a length to be between the bights of the ties and the line. Also, ties equipped with central sleeves 39 can be used with the sleeves 53', as seen at the left hand side of FIG. 8.

Figure 10:
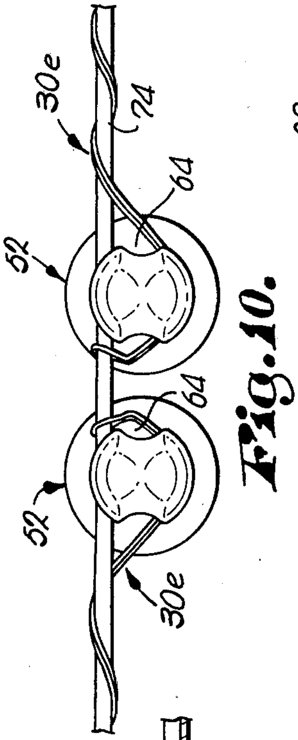
FIG. 10 is an elevational view of a conductor supported by a pair of adjacent insulator supports and having a single line tie in accordance with the invention yieldably securing the line to each insulator.

Yet another embodiment of the invention is illustrated in FIG. 10 wherein a pair of adjacent, side-mounted insulators 52 are employed to receive and support a conductor 74 within the uppermost portions of the respective peripheral grooves 64. In this case however, only a single line tie 30*e* is employed for securing conductor 74 to each insulator 52. Since the application and operation of the line ties in the embodiments of FIGS. 8 and 10 is essentially identical with that described above, discussion of these features will not be repeated other than to say that the desirable yieldable vibration-dampening line connection is maintained in all cases.

The line ties of the present invention are advantageously formed in substantially automated assembly line manner using the apparatus depicted in FIGS. 11–13, 15 and 17–21. In more detail, the first forming station illustrated in FIG. 11 comprises an elongated, two-section track structure 76 having a central, rotatable, powered forming arm 78 situated between the track sections. The left-hand track section illustrated in FIG. 11 includes an upstanding ledge 80 having a tapered upper surface 82 adjacent the forming arm 78, along with wire cutting mechanism 84 adjacent the remaining end of the left hand track section. Forming arm 78 includes a rotatable member 86 having a pair of spaced forming lugs 88 and 90 thereon, with member 86 being mounted on a link 92 which is pivotally mounted on an axle member 94.

Figure 12:
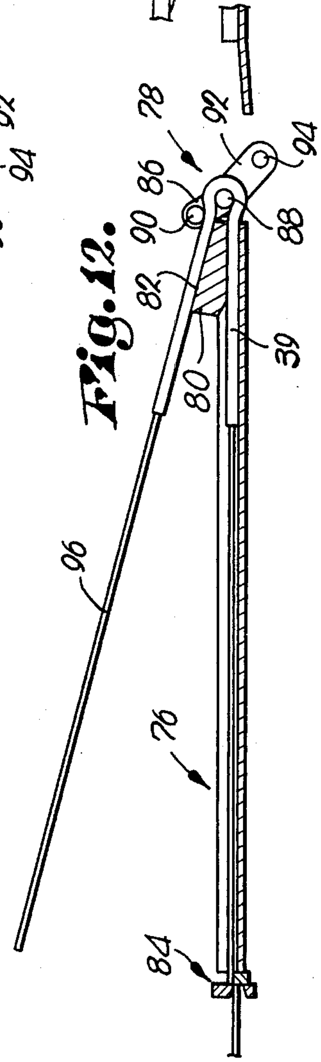
FIG. 12 is a fragmentary, elevational view of the first bend-forming step followed during the production of the line ties.

The first step of the preferred method involves positioning a sleeve 39 over a straight wire blank 96 by conventional means (not shown). During the first bend-forming operation, the wire blank 96 is in spanning relationship along the length of two-section track structure 76, whereupon forming mechanism 78 is rotated as illustrated in FIG. 12. This rotation causes a bight section intermediate the ends of blank 96 to be formed about lug 88, with the necked-down portion of the bight being formed by virtue of engagement of lug 90 with the blank. The depicted folding operation on blank 96 is continued until the upper leg thereof engages surface 82 of ledge 80 on the left-hand section of track structure 76.

Figure 15:
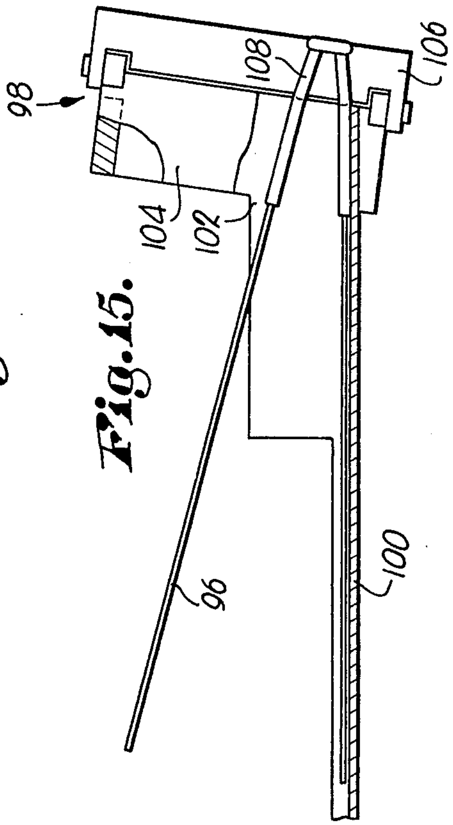
FIG. 15 is an elevational view similar to FIG. 13 of the method employed in the third bend forming step during the production of the ties hereof.
Figure 13:
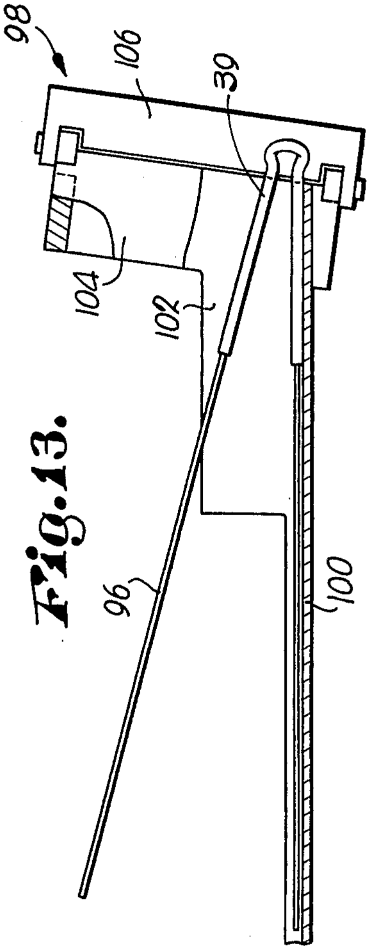
FIG. 13 is an elevational view with parts broken away for clarity of the apparatus and method employed in bending the generally U-shaped, central bight portion of a tie blank relative to the legs thereof.

The next two bending operations in the production of the line ties hereof are accomplished in bending station 98 depicted in FIGS. 13 and 15. Station 98 includes an elongated track 100 which is preferably a continuation of the right-hand section of track structure 76, along with a pair of upstanding, spaced, generally L-shaped members 102 and 104. A swingably mounted forming element 106 is pivotally secured to block 102 and is shiftable about an upright axis defined by the right-hand edge of block 102.

Figure 14:
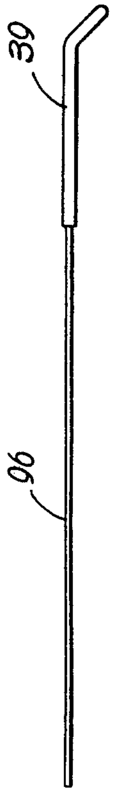
FIG. 14 is a side elevational view of the wire blank after the second bend-forming step is completed as illustrated in FIG. 13.

During the initial bending operation of the central bight portion formed in blank 96, the latter is positioned between the members 102 and 104 with the central bight portion extending therebeyond as illustrated. At this point forming element 106 is pivoted in a direction for bending the central bight portion relative to the remainder of the blank in order to configure the latter as shown in elevation in FIG. 14.

Figure 16:
FIG. 16 is a side elevational view of the wire blank shown after the third bend-forming step depicted in FIG. 15.

The second bending operation is also carried out at bending station 98 and simply involves shifting blank 96 so that an additional portion 108 thereof extends beyond the adjacent edges of blocks 102 and 104. Element 106 is then pivoted as before in order to bend blank 96 so that the latter assumes the configuration depicted in FIG. 16.

The apparatus 110 used for helically preforming the elongated, leg portions of the blank 96 is illustrated in FIGS. 17–21. Broadly, apparatus 110 includes an elongated forming rod 112 having a helical groove or track 114 therein adjacent the right-hand end thereof. Rod 112 is supported adjacent one end thereof by means of a block 116 having a pair of spaced, depending legs 119 and lower surface 118 which is generally V-shaped in cross-section as illustrated and is configured to complementally engage the previously bent portions of blank 96. The remaining end of rod 112 is supported by a block 120 which also supports a selectively actuatable, hydraulic piston and cylinder assembly 122. A reciprocable ram 124 extends from the end of assembly 122 along the length of rod 112 and parallel therewith as depicted.

An elongated, shiftable carriage 126 is coaxially mounted on rod 112 and includes an elongated, tubular body element 128 having a set screw 130 extending therethrough adjacent the right-hand end thereof as best illustrated in FIG. 18. Set screw 130 is adapted to seat within peripheral track 114 in rod 112 so that carriage 126 will follow a generally helical path of travel during shifting thereof along the length of rod 112.

A connection assembly 132 is mounted on the right-hand end of body member 128 and is apertured as at 134 for receiving the threaded end of ram 124 as shown in FIG. 18. Connection assembly 132 includes an annular, bearing-receiving member 136 and an adjacent, annular backing element 138. As shown, body member 128 has a radially extending flange 140 which, along with member 136, cooperatively receives a conventional ball bearing assembly 142 for ensuring smooth back and forth travel of carriage 126 along rod 112.

The work end of body member 128 includes a tapered, generally frustoconical forming section 144 and supports a generally radially extending arcuate tongue 146. Tongue 146 is configured to present a smoothly tapered arcuate wire-engaging surface 148 and carries a roller 150 adjacent body member 128. In addition, an unwinding lip 152 is provided adjacent the bottom of tongue 146 as viewed in FIG. 21.

In use, the previously bent blank 96 is positioned with the elongated leg portions thereof extending in side-by-side disposition between the depending legs 119 of block 116 and along the length of rod 112. At this point a transversely extending pusher rod 154 is employed to push the bent sections of blank 96 into conforming engagement with the lower surface 118 of block 116 as best seen in FIG. 18. In this configuration both of the legs of blank 96 extend generally upwardly from block 116 and along the length of rod 112, and do not straddle the latter. During this initial set-up operation, carriage 126 is in the position illustrated in FIG. 17 wherein tongue 146 is adjacent block 116.

The helical forming step involves retracting carriage 126 along the length of rod 112 in a generally helical manner. This is accomplished by retracting ram 124 into piston and cylinder assembly 122 as depicted by arrow 156 in FIG. 18. This causes surface 148 of tongue 146 to engage the adjacent leg portions of blank 96 and turn the legs as a unit around rod 112 as carriage 126 is retracted. Such helical forming is continued until the end of blank 96 is reached, at which point the terminal leg portions thereof will be helically formed. However, the end margins of the respective legs will characteristically remain slightly spaced from rod 112 which is important for reasons to be made clear.

During the unwinding operation (FIG. 19) carriage 126 is simply moved back along track 114 in a helical manner by the extension of rod 124 as depicted by arrow 158 in FIG. 19. This rotation of carriage member 126 causes the unwinding lip 152 of tongue 146 to engage the leg portions of blank 96 and progressively unwind the same. This unwinding is facilitated by virtue of the described, characteristic spacing between the end margins of the legs and rod 112. In addition, it has been found that unwinding in the manner described serves to simultaneously separate the respective leg portions of the blank so that substantially no further forming operations are required. Th completed blank 96 is then slipped off of rod 112 for final treatment thereof.

The last step in the fabrication of ties in accordance with the invention involves heat treatment of the formed wire member by passing a high amperage, low voltage current through the legs of the tie. In preferred forms wherein the wire material is that specified above, this current is from about 150 to 200 amps at a voltage of about 4 to 10 volts and is passed through the tie legs for a period of about 15 to 30 seconds so that a temperature of from about 500° to 550° F. is generated within the wire. This so-called "normalizing " treatment at the specified temperature range serves to stabilize the wire and impart a "memory" thereto so that the wire will maintain its desired configuration and resist the tendency to deform. Of course, as discussed above, the wire member remains resilient so that when placed under tension it serves to yieldably tie a conductor or the like to a support. In any event, this procedure produces the tie 30 illustrated in FIG. 1.

As indicated above, the helical legs of the tie may also be coated with an adhesively applied aluminum oxide grit. This serves to increase the holding power of the legs as is well known in this art.

The above discussion has centered around conventional metallic ties used in the electrical industry, but it is to be understood that the invention is not so limited. For example, a tie 160 (FIG. 22) can be provided which is completely formed of yieldable insulative synthetic resin material such as a polyethylene of the type used to fabricate the sleeve 39 of tie 30. As can be seen from a study of FIG. 22, tie 160 is identical in configuration to tie 30 and includes a central bight 162 and separate, adjacent, helically formed legs 164 each having a substantially V-shaped intermediate portion 166 therein. Tie 160 is used in a manner identical that of tie 30 and acts to yieldably hold a line in place on a support; accordingly, a detailed discussion of the installation and operation of tie 160 is felt to be superfluous and is omitted.

Having thus described the invention, what is claimed as new and desired to be secured by Letters Patent is:

1. A line tie for tying an elongated line to a support therefor, said support including a line-receiving opening and a line tie-engaging area spaced from said opening, said line tie comprising:

an elongated, unitary strand of substantially shape-retaining, yieldable material configured to present a generally U-shaped bight portion having spaced arms for receiving said line adjacent one side of said support, with an elongated leg portion extending from each of said arms, each of said leg portions being configured to present a line-gripping section spaced from a corresponding arm which includes a series of generally helical convolutions which are dimensioned for wrapping about and gripping said line at a point adjacent the side of said support opposite said one side thereof, each of said leg portions also including an intermediate section between each of said arms and a corresponding line-gripping section and having at least a pair of interconnected, generally straight segments disposed at an angle relative to each other, said intermediate sections each being of length and configuration for yieldably engaging the line tie-engaging area of said support for securing the line to the support.

2. The line tie as set forth in claim 1 wherein each of said intermediate sections is defined by a pair of elongated, adjacent, substantially rectilinear stretches of said strand.

3. The line tie as set forth in claim 1 including an abrasion resistant synthetic resin tubular protective element positioned about said bight portion and at least a part of each of said intermediate sections.

4. The line tie as set forth in claim 1 wherein the adjacent arms of said generally U-shaped bight portion are disposed at an angle relative to the adjacent sections of the corresponding leg portions.

5. The line tie as set forth in claim 4 wherein the intermediate section of each of said leg portions defines the ends of the latter connected to the corresponding arms of said bight portion.

6. The line tie as set forth in claim 1 wherein said bight portion is situated substantially midway between the ends of said strand.

7. The line tie as set forth in claim 1 wherein said leg portions are substantially parallel, extend in the same general direction, and are of substantially equal length.

8. The line tie as set forth in claim 1 wherein said strand is formed of substantially shape-retaining, bendable metallic wire.

9. The line tie as set forth in claim 1 wherein said strand is formed of substantially shape-retaining, yieldable synthetic resin material.

10. In combination:

an elongated line;

at least one support for said line including means defining an opening for receiving the line;

at least one elongated, unitary line tie formed of substantially shape-retaining, yieldable, material and presenting a generally U-shaped bight portion having spaced arms receving said line adjacent one side of said support, with an elongated leg portion extending from each of said arms in the same general direction and in crossing relationship to said support, each of said leg portions having a line-gripping section spaced from a corresponding arm which includes a series of generally helical convolutions in gripping engagement about said line at a point adjacent the side of said support opposite said one side thereof, each of said leg portions also including an intermediate section between each of said arms and a corresponding line gripping section and having at least a pair of interconnected, generally straight segments disposed at an angle relative to each other, each of said intermediate sections being free of said line and in engagement with said support at a point on the latter spaced from said line-receiving opening for placing the intermediate sections in tension for yieldably holding said line within said opening.

11. The combination as set forth in claim 10 wherein said support comprises an insulative member configured to present a first line-receiving groove, and a second line tie-receiving groove spaced from said first groove for permitting tensioned positioning of said intermediate sections therein for yieldably holding said line within the line-receiving groove.

12. The combination as set forth in claim 10 wherein a pair of said line ties are provided, with at least a part of the intermediate sections of each of said line ties being in engagement with said support as separate points on opposite sides of said line-receiving opening.

13. The combination as set forth in claim 12 wherein the bight portions of said pair of line ties are each positioned about said line adjacent said one side of the support with the corresponding leg portions of each of said ties extending in crossing relationship to said support and in the same general direction along the length of said line.

14. The combination as set forth in claim 12 wherein the respective bight portions of each of said pair of line ties receive said line on opposite sides of said support with the corresponding leg portions of each of said pair of line ties extending in generally opposite directions along the length of said line.

15. The combination as set forth in claim 10, including:

a pair of said supports positioned in spaced relationship and cooperatively receiving and supporting said line; and a pair of line ties for each support, with the bight portions of each pair of ties being positioned about said line adjacent one side of a corresponding support, with the leg portions of each of said ties extending in crossing relationship to the support and in the same general direction along the length of said line.

16. The combination as set forth in claim 15 including a resilient tubular sleeve positioned over said line at the sections thereof received within said supports, each of said sleeves extending between the adjacent bight portions of said ties and said line.

17. The combination as set forth in claim 10 wherein a pair of said line ties are provided, with at least a part of the intermediate sections of each of said line ties engaging said support on one side of said line-receiving opening, the intermediate sections of said pair of line ties being in proximal, side-by-side disposition.

18. The combination as set forth in claim 10 including a resilient sleeve member positioned about the section of said line received within said line-receiving opening.

19. The combination as set forth in claim 10 including an abrasion resistant synthetic resin tubular protective element positioned about said bight portion and at least a part of each of said intermediate sections.

20. A method of forming a line tie comprising the steps of:

providing an elongated strand of material;

forming said strand of material to present a generally U-shaped bight portion having spaced arms intermediate the ends of said strand, and an elongated leg portion extending from each arm with the respective leg portions extending in the same general direction from said bight portion;

positioning said strand of material adjacent an elongated forming rod with said leg portions extending generally along the length of the latter;

positioning strand-engaging means in engagement with at least one of said leg portions; and causing relative, generally helical shifting movement between said rod and strand-engaging means for causing the latter to slidingly engage said leg portion and form at least a part of both of said leg portions about said rod in a generally helical manner.

21. The method as set forth in claim 20 wherein said first forming step includes the steps of:

folding said strand of material back upon itself to present said bight portion;

bending said bight portion for defining an angle between said arms and the adjacent sections of the leg portions; and bending each of said leg portions at a point spaced from said bight portion for defining an intermediate section in each of said leg portions between said bight portion and the corresponding helically formed parts thereof, each of said intermediate portions including at least a pair of interconnected, generally straight segments disposed at an angle relative to each other.

22. The method as set forth in claim 20 including the steps of:

positioning strand-engaging structure in engagement with at least one of said leg portions when the latter are formed around said rod; and causing relative helical shifting movement between said strand-engaging structure and rod in a direction for unwinding both of said leg portions from said rod.

23. The method of claim 20 wherein said rod is stationary and said strand engaging means is moved helically along the length of said rod.

* * * * *